United States Patent
DeMars

(10) Patent No.: US 6,401,985 B1
(45) Date of Patent: Jun. 11, 2002

(54) LIQUID DISPENSING APPARATUS

(76) Inventor: Robert A. DeMars, 2323221 Ladrillo Ave., Woodland Hills, CA (US) 91367-4134

( * ) Notice: Subject to any disclaimer, the term of this patent is extended or adjusted under 35 U.S.C. 154(b) by 0 days.

(21) Appl. No.: 09/722,211

(22) Filed: Nov. 27, 2000

(51) Int. Cl.$^7$ .............................................. B65D 37/00
(52) U.S. Cl. ...................... 222/209; 222/129; 222/401; 222/484; 141/18; 141/25; 141/26
(58) Field of Search ................................ 222/209, 484, 222/400.8, 401, 129, 130, 400.7; 141/18, 25, 26, 28

(56) References Cited

U.S. PATENT DOCUMENTS

| | | | | |
|---|---|---|---|---|
| 929,990 A | * | 8/1909 | Shields | 222/209 |
| 1,888,768 A | * | 11/1932 | Lach | 222/190 |
| 1,919,257 A | * | 7/1933 | Renzenhausen | 222/180 |
| 2,652,952 A | * | 9/1953 | Mowbray | 222/180 |
| 2,665,825 A | * | 1/1954 | Poitras et al. | 222/209 |
| 3,214,066 A | | 10/1965 | Shirley et al. | 222/209 |
| 3,534,785 A | * | 10/1970 | Bensen | 141/41 |
| 3,952,924 A | | 4/1976 | Benson | 222/181 |
| 4,007,674 A | * | 2/1977 | Lichowsky | 99/281 |
| 4,116,366 A | * | 9/1978 | Takenakashima et al. | 222/131 |
| 4,290,537 A | | 9/1981 | Chi-Jung | 222/25 |
| 4,310,104 A | * | 1/1982 | Takatsuki | 222/131 |
| 4,359,174 A | * | 11/1982 | Ikunosuke et al. | 222/131 |
| 4,386,556 A | | 6/1983 | Romey, Sr. | 99/290 |
| 4,517,445 A | * | 5/1985 | Tatsumi et al. | 219/297 |
| 4,550,864 A | | 11/1985 | Tarozzi et al. | 222/209 |
| 4,667,856 A | | 5/1987 | Nelson | 222/180 |
| 4,878,604 A | * | 11/1989 | Barriac | 222/209 |
| 4,880,161 A | * | 11/1989 | Wright | 239/330 |
| 5,098,428 A | * | 3/1992 | Sandlin et al. | 606/22 |
| 5,269,444 A | * | 12/1993 | Wright | 222/190 |
| 5,335,706 A | | 8/1994 | Morishita et al. | 141/275 |
| 5,427,279 A | * | 6/1995 | Kaufman | 222/207 |
| 5,848,623 A | | 12/1998 | Veda | 141/64 |
| 5,887,760 A | | 3/1999 | Johnson | 222/209 |
| 5,957,340 A | * | 9/1999 | Sawicki | 222/209 |
| 5,961,004 A | | 10/1999 | DeMars | 222/205 |
| 5,964,379 A | | 10/1999 | DeMars | 222/205 |
| 5,971,209 A | | 10/1999 | Bayless | 222/135 |
| 5,984,139 A | | 11/1999 | Moran et al. | 222/1 |
| 6,035,646 A | * | 3/2000 | Griswold | 62/50.1 |
| 6,119,900 A | * | 9/2000 | Iwamoto et al. | 222/209 |

\* cited by examiner

*Primary Examiner*—William C. Doerrler
*Assistant Examiner*—Frederick Nicolas
(74) *Attorney, Agent, or Firm*—Jack C. Munro

(57) ABSTRACT

The present invention relates to a liquid dispensing apparatus comprising a liquid container, a base and an air pressure device; the liquid container has an internal reservoir for containing the liquid and a dispensing conduit connected to a dispensing nozzle; a part of the dispensing conduit may be situated within the reservoir and is adapted to transfer the liquid from the reservoir to the dispensing nozzle; the base has a surface for holding a liquid receiver; the dispensing nozzle of the liquid container may be positioned above the surface of the base so that when the liquid receiver is situated upon the surface, the liquid from the dispensing nozzle will go into the receiver; the air pressure device is designed for creating pressurized air and is mounted in conjunction with the base; the pressurized device is connected with the internal reservoir of the liquid container, whereby upon operation of the air pressure device, pressurized air is supplied to the internal reservoir of the liquid container which causes the liquid within the reservoir to be transferred into and through the dispensing conduit and out of the dispensing nozzle.

28 Claims, 3 Drawing Sheets

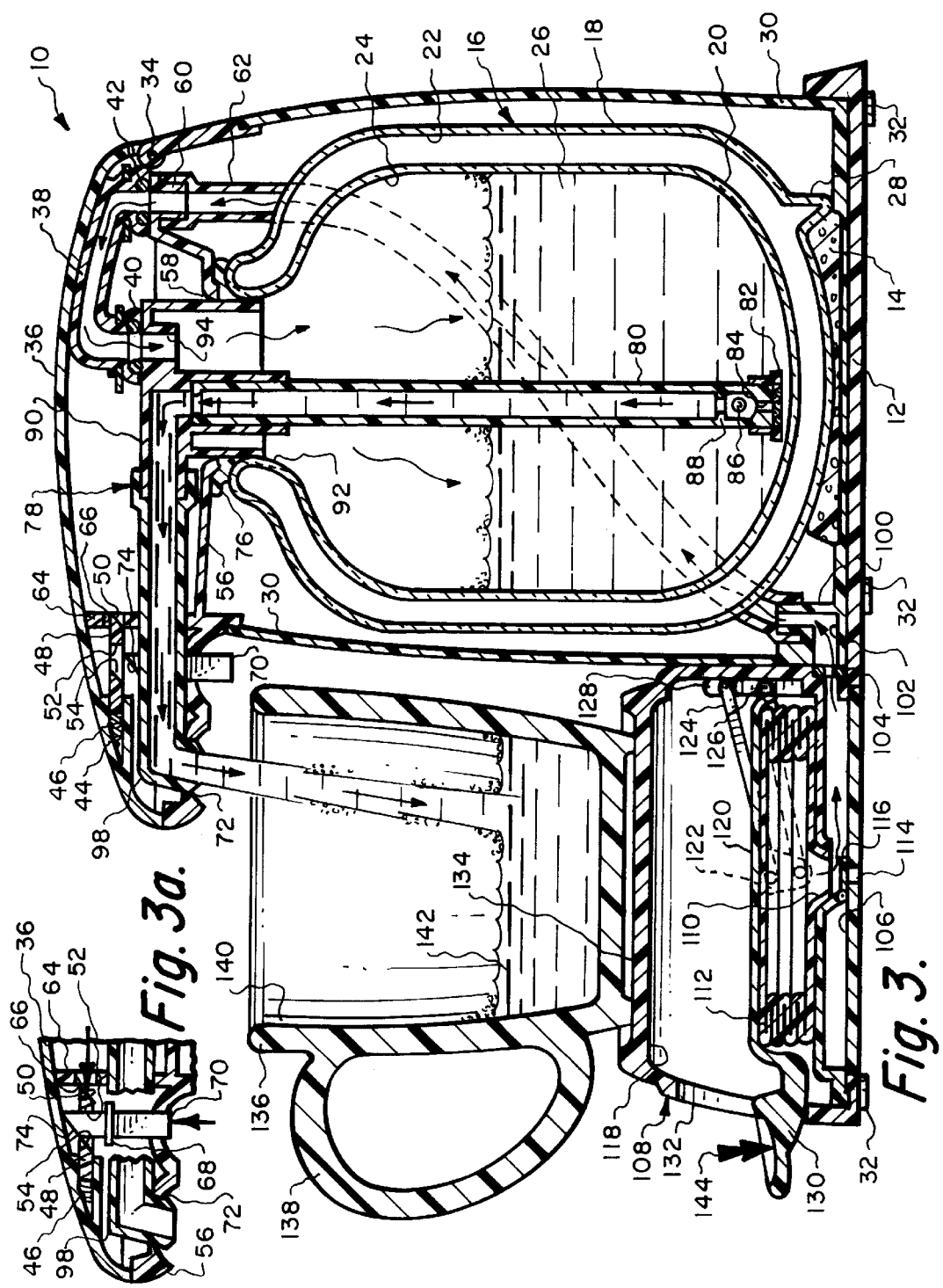

LIQUID DISPENSING APPARATUS

BACKGROUND OF THE INVENTION

1. Field of the Invention

This invention relates to an apparatus for dispensing liquid and more particularly, to a manually operated liquid dispensing system that can dispense a quantity of either a hot or cold liquid into a conventional coffee/tea type of a cup or mug.

2. Description of the Related Art

It has been known to construct beverage dispensers using air bottle technology. Air bottles use air pumps to cause air to be pressurized within an interior of the air bottle, which then functions to force the liquid from the air bottle to be dispensed through a dispensing nozzle. Most air bottle beverage dispensers are commonly used in conjunction with a substantial volume of the beverage, such as fifteen to twenty cups of coffee, for example. These types of air bottle beverage dispensers have been used in fast food restaurants, motels, hotels, country clubs and other similar types of public establishments, which cater to large number of customers on a daily basis. There is not known an air bottle dispenser designed for individual use or targeted for use at an individual's workstation.

SUMMARY OF THE INVENTION

In one embodiment, the present invention relates to a liquid dispensing apparatus comprising a liquid container, a base and an air pressure device. In another embodiment, the liquid container has an internal reservoir for containing the liquid and a dispensing conduit connected to a dispensing nozzle; the dispensing conduit is connected within the reservoir and is used to transfer the liquid from the reservoir to the dispensing nozzle. In still another embodiment, the base has a surface for supporting a liquid receiver; the dispensing nozzle of the liquid container is spaced from the surface of the base so that when the liquid receiver is situated upon the surface, the liquid from the dispensing nozzle will flow into the receiver. In yet another embodiment, the air pressure device is designed for creating pressurized air and is mounted in conjunction with the base; the pressurized device is connected with the internal reservoir of the liquid container, whereby upon operation of the air pressure device, pressurized air is supplied to the internal reservoir of the liquid container which causes the liquid within the reservoir to flow into and through the dispensing conduit and out of the dispensing nozzle.

In still yet another embodiment, the apparatus further comprises a liquid receiver designed to rest upon the surface of the base and receive liquid from the dispensing nozzle upon activation of the air pressure device. For purposes of this invention, a liquid receiver can be anything that can retain liquid including, but not limited to, cups, mugs, glasses, etc. In another embodiment, the liquid receiver is removable from the surface of the base.

In a further embodiment, the apparatus further comprises a pressurized air transfer conduit for connecting the air pressure device to the internal reservoir of the liquid container. In yet a further embodiment, the apparatus further comprises a plurality of conduit connectors. In a further embodiment, the air pressure device further comprises a device for evenly collapsing the bellows.

In still a further embodiment, the air pressure device comprises a bellows. In still a further embodiment, the bellows is collapsible and expandable by a parallelogram linkage arrangement. In still yet a further embodiment, the base has an internal compartment for housing the air pressure device and the base further comprises an external activation mechanism for operating the air pressure device.

In yet a further embodiment, the liquid container comprises a removable cap for access to resupplying liquid to within the internal reservoir of the liquid container. In still yet a further embodiment, the dispensing conduit and the dispensing nozzle are removable from the internal reservoir for purpose of cleaning. In still another further embodiment, there is a lid which covers the container with the lid being hingedly connected to a housing to be movable between a closed position and an open position. In still a further embodiment, there is a connecting conduit mounted in the lid which connects with the air transfer conduit with this connecting conduit separating from the air transfer conduit during movement of the lid to an open position. The container can also have a latching mechanism for securing the lid to the housing.

In yet another further embodiment, the apparatus further comprises a pressurized air transfer conduit for connecting the air pressure device to the liquid container and the base further comprises at least one passage leading from the air pressure device to the transfer conduit. In another embodiment, the pressurized air will travel from the air pressure device (bellows) through the channel and then through the transfer conduit and into the reservoir of the liquid container.

In still yet another further embodiment, the apparatus further comprises a heat retaining device situated underneath and in contact with the liquid container to retain the temperature of a hot or cold liquid in the liquid container.

In still another embodiment, the liquid container comprises insulated walls for retaining the temperature of the liquid within the internal reservoir. In yet another embodiment, the liquid container of the apparatus is situated upon the base and is removable from the base for cleaning purposes.

In another embodiment, the present invention relates to a liquid dispensing system comprising: a housing comprising a base and at least two compartments for encasing a liquid container and an air pressure device; the liquid container has an internal reservoir for containing a liquid and a dispensing conduit connected to a dispensing nozzle; the dispensing conduit may be situated within the reservoir and may be adapted to transfer the liquid from the reservoir to the dispensing nozzle; the base further comprising a surface for supporting a liquid receiver; the dispensing nozzle of the liquid container may be positioned above the surface; the liquid container is situated within a first compartment; and the air pressure device for creating pressurized air may be mounted within a second compartment; the air pressure device may be connected with the internal reservoir of the liquid container, whereby upon operation of the air pressure device, pressurized air is supplied to the internal reservoir of the liquid container which causes the liquid within the reservoir to flow into and through the dispensing conduit and out of the dispensing nozzle.

In still another embodiment, the system further comprises a liquid receiver designed to rest upon the surface of the base and receive liquid from the dispensing nozzle upon activation of the air pressure device. In yet another embodiment, the liquid receiver has a receiving chamber and the receiving chamber is positioned beneath the dispensing nozzle when the liquid receiver is resting upon the surface of the housing so the liquid will flow by gravity into the receiving chamber.

In still yet another embodiment, the system further comprises a pressurized air transfer conduit for connecting the air pressure device to the internal reservoir of the liquid container. For purposes of this invention, the air pressure device is any device that can create pressurized air. In a further embodiment, the air pressure device comprises bellows. In another further embodiment, the air pressure device of the present invention may be manually operated. In still a further embodiment, the air pressure device includes an external activation mechanism for operating the air pressure device.

In yet a further embodiment, the liquid container of the system of the present invention comprises a removable cap for access to resupplying liquid within the internal reservoir of the liquid container. In still yet a further embodiment, the dispensing conduit and the dispensing nozzle are disconnectable from a housing to which such are attached for purposes of cleaning.

In another embodiment, the beverage dispenser of the present invention utilizes an air bottle which contains an internal reservoir that is capable of supporting a quantity of a liquid to be dispensed, such as between two and ten cups of the liquid. For purposes of this invention, the internal reservoir may be any liquid retaining chamber or cavity. This air bottle is mounted on a supporting base. Connected within the internal chamber of the air bottle is a dispensing conduit, which terminates into a dispensing nozzle. The dispensing conduit and dispensing nozzle are capable of being removed from the air bottle with the air bottle also being disengageable from the base in order to facilitate cleaning of the internal reservoir and resupplying of the heated liquid within the internal reservoir. The dispensing nozzle is positioned so as to dispense a quantity of the liquid within the receiving chamber of a receiving container or liquid receiver. The receiver may be mounted on a receiver surface which is positioned beneath the dispensing nozzle. Contained within the base is an air pressure device, such as a bellows. The bellows is to be manually operated by the user to supply air pressure within the internal reservoir of the air bottle which will cause the liquid to be forced through the dispensing conduit to be dispensed from the dispensing nozzle.

In another further embodiment, the present invention relates to a method of manufacturing a liquid dispensing apparatus comprising: providing an apparatus comprising a liquid container having an internal reservoir for containing a liquid and a dispensing conduit connected to a dispensing nozzle; the dispensing conduit being situated within the reservoir and being adapted to transfer the liquid from the reservoir to the dispensing nozzle; a base having a surface for holding a liquid receiver; the dispensing nozzle of the liquid container being positioned above the surface; and an air pressure device for creating pressurized air being mounted in conjunction with the base; the air pressure device being connected with the internal reservoir of the liquid container, whereby upon operation of the air pressure device, pressurized air is supplied to the internal reservoir of the liquid container which causes the liquid within the reservoir to be transferred into and through the dispensing conduit and out of the dispensing nozzle. In still another further embodiment, the method further comprises: filling the internal reservoir with liquid and placing a liquid receiver onto the surface of the base; and activating the air pressure device and allowing pressurized air to enter the internal reservoir and cause the liquid within the reservoir to flow through the dispensing conduit and out of the dispensing nozzle and into the liquid receiver.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

FIG. 3 is a view similar to FIG. 2 but showing the dispensing apparatus in the dispensing position;

FIG. 3a is a view of the latching mechanism that is associated with the lid of the liquid dispensing apparatus of the present invention showing the latching mechanism in the unlatched position which will permit movement of the lid of the liquid dispensing apparatus to the open position, which is shown in FIG. 4.

Figure 1:
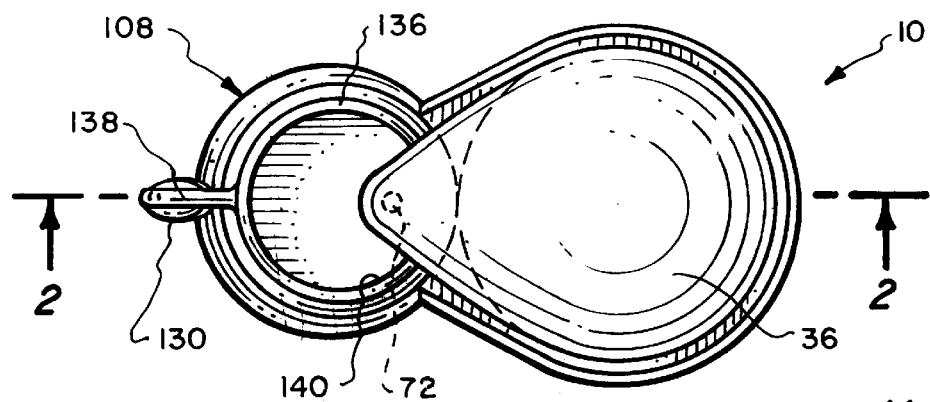
FIG. 1 is a top plan view of the liquid dispensing apparatus of the present invention.

Among those benefits and improvements that have been disclosed, other objects and advantages of a this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessary to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Referring particularly to the drawings, there is shown one form of liquid dispensing apparatus of this invention which is commonly referred to as an air bottle 10, which has a substantially planar platform 12. Normally the platform 12 will be constructed of plastic. Exteriorly mounted on the platform 12 are a plurality of foot pads 32. These foot pads 32 are to rest on a supporting surface, which is not shown, which would normally comprise a table. Mounted on the interior surface of the platform 12 is a plastic foam cradle 14. Resting, but not fixedly secured thereto, on the foam cradle 14 is a liquid container referred as an air bottle 16. The foam cradle 14 not only provides a nesting surface for the air bottle 16 but also assists in retaining heat or cold of a hot or cold beverage that is contained within the reservoir 24 of the air bottle 16. The air bottle 16 is deemed to be of conventional construction and is formed of an outer wall which is integrally connected to an inner wall 20. In between the outer wall 18 and the inner wall 20 is an air space 22 which is to function as a heat insulator. The air space 22 could also be filled with a material that would be intended to deter the escape of heat from within the internal chamber 24 of the air bottle 16. The internal chamber or reservoir 24 is designed to be filled or partially filled with a hot liquid 26. A typical hot liquid would be coffee or tea. It is to be understood to be within the scope of this invention that instead of a hot liquid 26 being utilized, there may be utilized a cold liquid or even a room temperature liquid. The outer wall 18 includes a protuberance 28 which is normally formed during manufacture of the air bottle 16 if it is constructed of blown glass. This protuberance 28 can be used as a positioner to abut against the foam cradle 14 and therefore inform the user that the air bottle 16 is in its proper location on the foam cradle 14.

Figure 4:
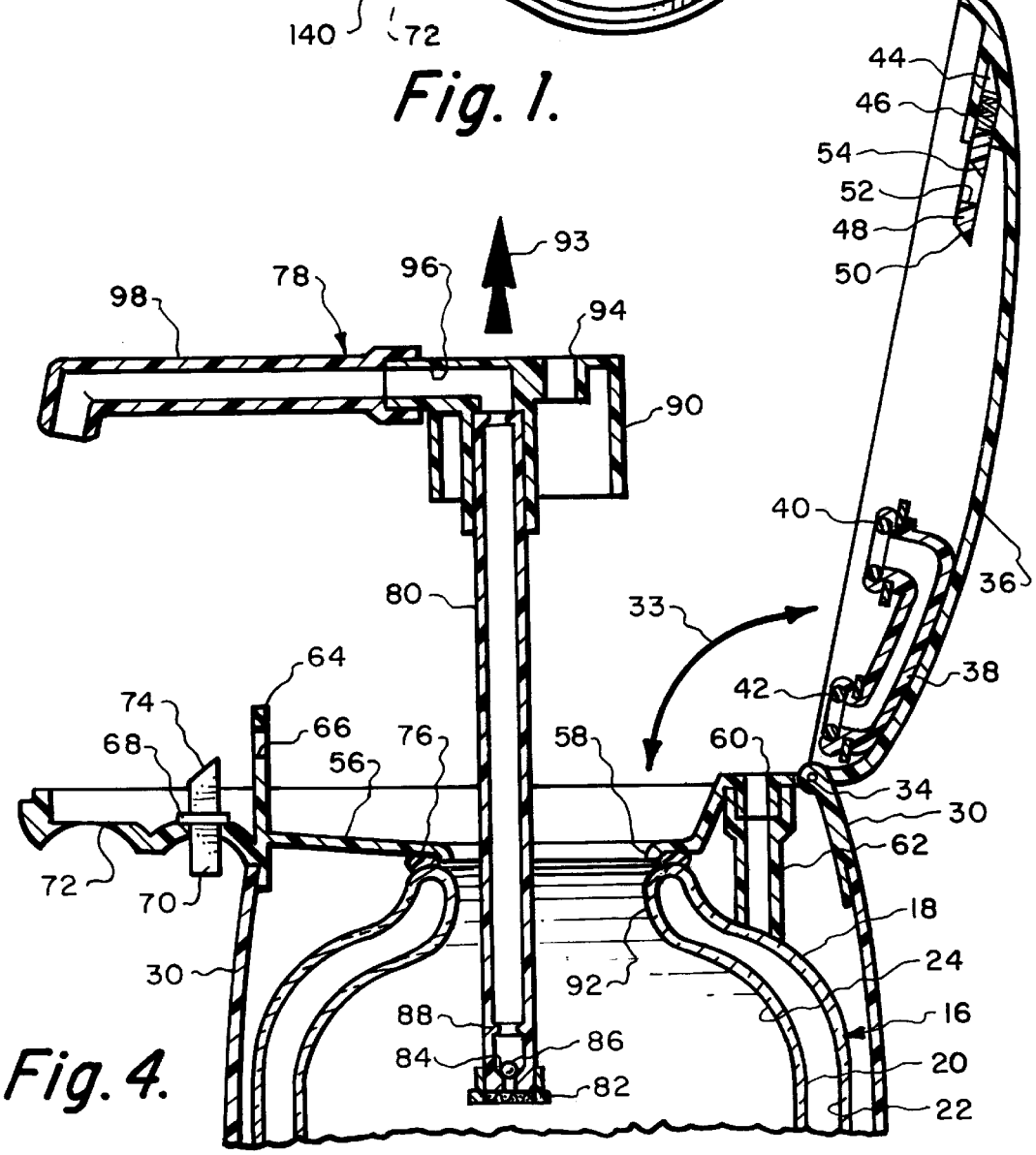
FIG. 4 is a cross-sectional view through the liquid dispensing apparatus of the present invention with the lid in the open position, which permits removal of a liquid container for purposes of cleaning and resupplying a hot liquid into the liquid container.

Surrounding the air bottle 16 is a sheet material housing 30. Typically, this housing 30 will also be constructed of plastic. The housing 30 includes a hinge 34 to which is pivotally connected a sheet material lid 36. The lid 36 is pivotable as indicated by arrow 33 from the closed position to the open position, as shown in FIG. 4. Fixedly mounted against the interior surface of the lid 36 is a connecting conduit 38. The connecting conduit 38 terminates at each end in flexible connectors 40 and 42. The flexible connectors 40 and 42 function to achieve a liquid tight seal between conduit 62 and cap 90 when in the closed position and yet permit the disengagement of the connecting conduit 38 from the cap 90 and conduit 62 when in the open position. Also formed within the interior surface of the lid 36 is a hole 44. Mounted within the hole 44 is a coil spring 46. Also mounted within the hole 44 and abutting against the coil spring 46 is the inner end of a pin 48. Pin 48 has a chamfered outer end 50 and a hole 52 located intermediate the ends of the pin 48. The aft edge of the hole 52 is slanted forming a chamfer 54.

Also hingedly mounted by the hinge 34 is an inner wall 56. The inner wall 56 includes an enlarged opening 58. The inner wall 56 also includes a conduit connector 60. Connecting with the conduit connector 60 is a length of flexible conduit 62.

Typically, the conduit 62 will be of a rubber or plastic material. Integrally formed on the inner wall 56 is an upstanding wall 64. The upstanding wall 64 includes a hole 66. Also mounted on the inner wall 56 is an elongated rod 70. The rod 70 has mounted thereon a ring 68. The elongated rod 70 is mounted within an appropriate opening formed within the inner wall 56. The inner wall 56 also includes a dispensing opening 72. The elongated rod 70 terminates at its inner end in a bevel 74.

Mounted on the inner wall 56 surrounding the enlarged opening 58 is a rubber or plastic gasket 76, which is to be used to form a liquid tight seal with the air bottle 16. When the inner wall 56 is pivoted to a right angled position similar to the position shown in FIG. 4 of the drawings of the lid 36, the air bottle 16 is capable of being removed from within the housing 30. The internal chamber 24 of the air bottle 16 can then be cleaned and can be resupplied of a quantity of the hot liquid 26. The air bottle 16 would then normally be reinserted back within the housing 30 and the inner wall 56 then normally moved to the position shown in FIG. 4 of the drawings. There may be a latch (not shown) provided between the inner wall 56 and the housing 30 that is located diametrically opposite the hinge 34 and directly adjacent the elongated rod 70.

The user then is to insert within the internal chamber 24 a dispensing conduit 78. The dispensing conduit 78 includes a vertical member 80, which terminates at its lower end in a screen 82. A ball 86 is to be locatable against the seat 82 which will function to prevent reverse flow of the liquid 26 from the dispensing conduit 78 back into the internal chamber 24. Upper movement of the ball 86 is prevented by a protuberance 88. The vertical member 80 is fixedly mounted to a cap 90. Cap 90 is designed to slip through the enlarged opening 58 and fit within the access opening 92 in a snug fit manner within the air bottle 16. Included within the cap 90 is a short conduit 94. The cap 90 also includes an internal passage 96. The internal passage 96 is connected to a dispensing nozzle 98.

Figure 2:
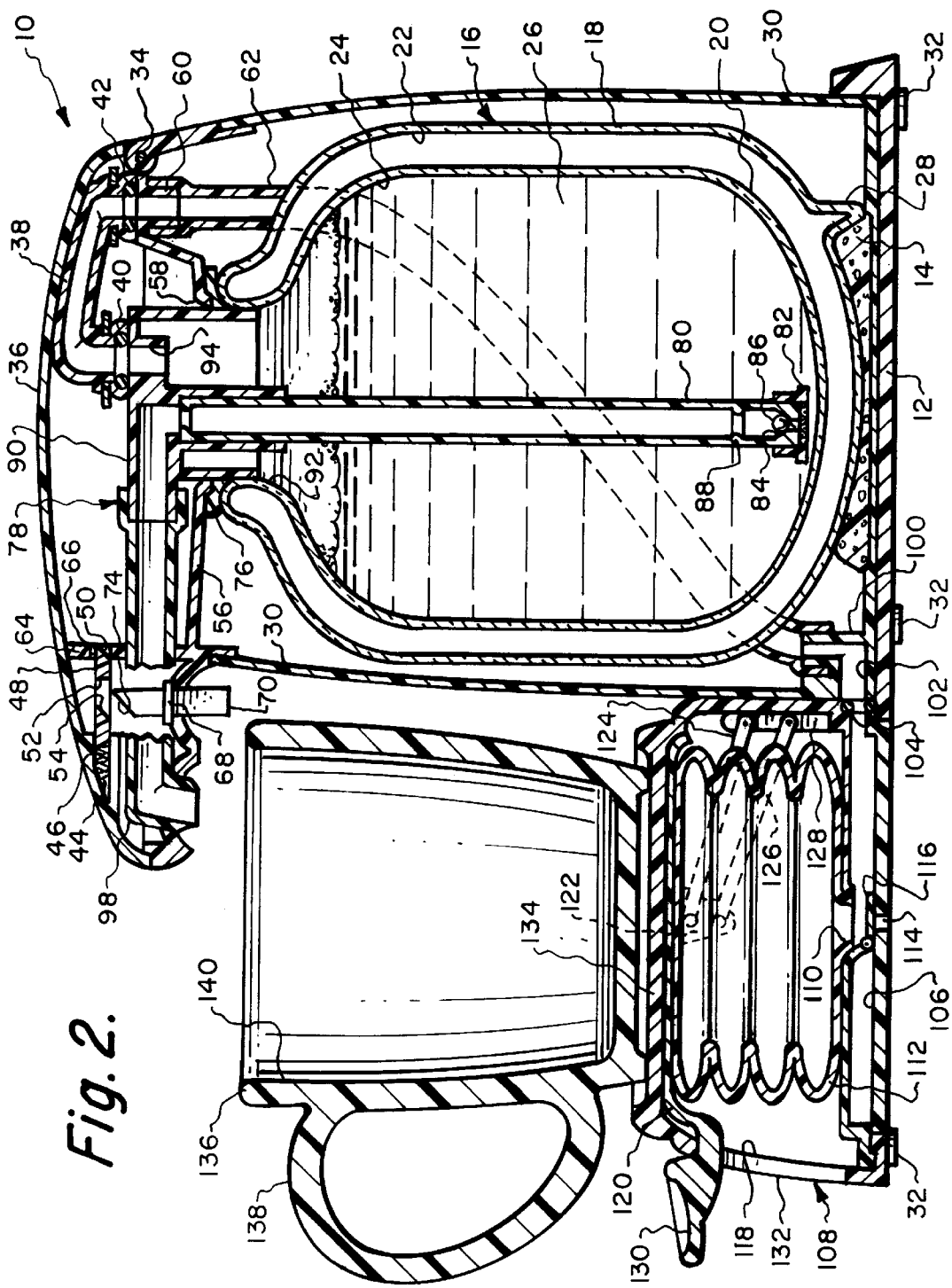
FIG. 2 is a transverse cross-sectional view through the liquid dispensing apparatus of the present invention showing the dispensing apparatus in its dormant, non-dispensing position.

With the vertical member 80 inserted within the internal chamber 24, and the cap 90 snugly retained within the access opening 92, and the dispensing nozzle 98 connecting with the dispensing opening 72, the lid 36 can then be moved from the open position, shown in FIG. 4, to the closed position, as shown in FIGS. 2 and 3. When doing so, the flexible connector 42 forms a liquid-tight fit with the short conduit 94. Just prior to complete closing movement of the lid 36, the outer end 50 of the pin 48 will ride over the upstanding wall 64 until the upstanding wall 64 will come into contact with the interior surface of the lid 36. In this position, the outer end 50 will then engage with the hole 66. At this time, the lid 36 is now latched to the inner wall 56 and is fixed thereto.

When it is desired to disengage the lid 36 and move such to the open position shown in FIG. 4, the user manually applies pressure against the elongated rod 70 moving such in an upward direction and causing bevel 74 to come into contact with the chamber 54. Continual upward movement of the elongated rod 70 will cause the pin 48 to move longitudinally compressing of coil spring 46 and dislocating the outer end 50 from the hole 66. This position is shown in FIG. 3a of the drawings. Movement of the lid 36 to the open position, which is approximately ninety degrees displaced from the closed position, is then permitted, as is shown in FIG. 4. The dispensing conduit 78 can then be removed as indicated by arrow 93 from the connection with the air bottle 16.

The inner end of the flexible conduit 62 is mounted on a conduit connector 100. Conduit connector 100 has an internal passage 102, which connects by an O-ring 104 to a passage 106. Passage 106 is formed within a receiving container base 108. The passage 106 connects with a hole 110, which is formed within a flexible walled bellows 112. Typically, construction of the bellows 112 would be a rubber composition. Located directly adjacent the hole 110 but formed within the platform 12 is an air hole 114. The air hole 114 is closed by a flapper valve 116. The bellows 112 is mounted within internal chamber 118 of the receiving container base 108. Movement of the bellows 112 from the collapsed position shown in FIG. 1 to the expanded position shown in FIG. 2 will cause flapper valve 116 to be unseated and air will enter the bellows 112 through air hole 114.

Located against the upper surface of the bellows 112 is a plate 120. The plate 120 has a pair of diametrically opposed depending ears 122. To each ear 122 is mounted a pair of links 124 and 126. The outer end of the links 124 and 126 are connected to member 128 which is fixedly mounted to the receiving container base 108. The plate 120 is integrally connected to a handle 130. The handle 130 protrudes exteriorly through a slot 132 formed within the receiving container base 108.

The upper surface of the receiving container base 108 includes a resting surface 134. On the resting surface 134 there is to be located a receiving container 136. The receiving container 136, which resembles a coffee cup or mug, has a handle 138 and a receiving chamber 140. The receiving container 136 is located on the resting surface 134 which positions the receiving chamber 140 directly beneath the dispensing nozzle 98.

When the user desires to supply a consumable portion 142 of a hot liquid 26 within the receiving chamber 140, the user manually presses down on the handle 130 in the direction of arrow 144. This will cause the plate 120 to move against the bellows 112 with the plate being maintained in a horizontal position at all times due to the parallelogram linkage arrangement formed by links 124 and 126. It is to be understood that there are actually two sets of the links 124 and 126 with each pair of links 124 and 126 being connected to an ear 122. This horizontal movement of the plate 120 insures that the bellows 112 is evenly collapsed and can be totally compressed to the position shown in FIG. 3. The air that is contained within the bellows 112 is forced through the passage 106, the flexible conduit 62, through the connecting conduit 38, through the short conduit 94 and into the internal chamber 24. This pressurized air will be applied against the surface of the hot liquid 26 causing some of the hot liquid 26 to be moved past the ball 86 to within the vertical member 80 through the dispensing nozzle 98 to be then deposited within the receiving chamber 140. With each depression of the lever 130, a small quantity of the liquid 26 will be squirted into the receiving chamber 140 forming the consumable portion 142. When the consumable portion 142 achieves the desired amount, according to the individual's desires, then further depression of the lever 130 is not continued. The receiving container 136 is then to be physically separated from the resting surface 134 by grasping of the handle 138 and moving such to the desired location in order to consume the consumable portion 142 within the receiving container 136.

When it is desired to resupply more of the hot liquid 26 within the receiving container 136, the receiving container 136 is again located on the resting surface 134 and the depressing procedure of the handle 130 is to be repeated.

Numerous modifications and variations of the present invention are possible in light of the above teachings. It is therefore to be understood that within the scope of the attendant claims attached hereto, this invention may be practiced otherwise than as specifically disclosed herein.

What is claimed:

1. A liquid dispensing apparatus comprising:
   a liquid container having an internal reservoir for containing a liquid and a dispensing conduit connected to a dispensing nozzle, said dispensing conduit being connected with said internal reservoir and being adapted to transfer the liquid from said internal reservoir to said dispensing nozzle;
   a base having a surface for holding a liquid receiver, said dispensing nozzle being spaced from said surface; and
   an air pressure device for creating pressurized air being mounted in conjunction with said base, said air pressure device being connected with said internal reservoir, whereby upon operation of said air pressure device pressurized air is supplied to said internal reservoir which causes the liquid within said internal reservoir to be transferred into and through said dispensing conduit and out of said dispensing nozzle.

2. The apparatus of claim 1 further comprising:
   a liquid receiver designed to rest upon said surface and receive liquid from said dispensing nozzle upon activation of said air pressure device.

3. The apparatus of claim 1 further comprising:
   an air transfer conduit for connecting said air pressure device to said internal reservoir.

4. The apparatus of claim 1 wherein:
   said air pressure device comprises bellows.

5. The apparatus of claim 1 wherein:
   said liquid container comprises insulated walls for retaining the temperature of the liquid within said internal reservoir.

6. The apparatus of claim 1 wherein:
   said liquid container is situated upon a platform and is removable from said platform.

7. The apparatus of claim 6 further comprising:
   a heat retaining device situated against said liquid container and located between said liquid container and said platform.

8. A liquid dispensing apparatus comprising:
   a liquid container having an internal reservoir for containing a liquid and a dispensing conduit connected to a dispensing nozzle, said dispensing conduit being connected with said internal reservoir and being adapted to transfer the liquid from said internal reservoir to said dispensing nozzle;
   a base having a surface for holding a liquid receiver, said dispensing nozzle being spaced from said surface;
   an air pressure device for creating pressurized air being mounted in conjunction with said base, said air pressure device being connected with said internal reservoir, whereby upon operation of said air pressure device pressurized air is supplied to said internal reservoir which causes the liquid within said internal reservoir to be transferred into and through said dispensing conduit and out of said dispensing nozzle; and
   said base comprises an internal compartment for housing said air pressure device, said air pressure device further has an activation mechanism located externally of said base for operating said air pressure device.

9. The apparatus of claim 8 wherein:
   said air pressure device comprises a bellows, said bellows being movable to a collapsed position by said activation mechanism, said apparatus further comprising means for evenly collapsing said bellows.

10. The apparatus of claim 9 wherein:
    said means comprising a parallelogram linkage arrangement.

11. The apparatus of claim 8 further comprising:
    an air transfer conduit for connecting said air pressure device to said liquid container and said base further comprising at least one passage leading from said air pressure device to said transfer conduit.

12. A liquid dispensing apparatus comprising:
    a liquid container having an internal reservoir for containing a liquid and a dispensing conduit connected to a dispensing nozzle, said dispensing conduit being connected with said internal reservoir and being adapted to transfer the liquid from said internal reservoir to said dispensing nozzle;
    a base having a surface for holding a liquid receiver, said dispensing nozzle being spaced from said surface;
    an air pressure device for creating pressurized air being mounted in conjunction with said base, said air pressure device being connected with said internal reservoir, whereby upon operation of said air pressure device pressurized air is supplied to said internal reservoir which causes the liquid within said internal reservoir to be transferred into and through said dispensing conduit and out of said dispensing nozzle; and said liquid container comprises a removable cap for access to said internal reservoir for resupplying liquid to within said internal reservoir, said dispensing conduit and said dispensing nozzle being disconnectable from said internal reservoir.

13. A liquid dispensing apparatus comprising:

a liquid container having an internal reservoir for containing a liquid and a dispensing conduit connected to a dispensing nozzle, said dispensing conduit being connected with said internal reservoir and being adapted to transfer the liquid from said internal reservoir to said dispensing nozzle;

a base having a surface for holding a liquid receiver, said dispensing nozzle being spaced from said surface;

an air pressure device for creating pressurized air being mounted in conjunction with said base, said air pressure device being connected with said internal reservoir, whereby upon operation of said air pressure device pressurized air is supplied to said internal reservoir which causes the liquid within said internal reservoir to be transferred into and through said dispensing conduit and out of said dispensing nozzle; and said liquid container being mounted within a housing, said housing comprising a lid, said lid being movable between a closed position enclosing said liquid container to an open position permitting access to said liquid container, said lid having a latching means for securing of said lid to said housing when said lid is in said closed position, said latching means being operable to unsecure said lid from said housing to permit said lid to be moved to said open position.

14. The apparatus of claim 13 wherein:

said lid having a connecting conduit which connects with said air transfer conduit, said connecting conduit separates from said air transfer conduit when said lid is located in said open position.

15. The apparatus of claim 14 wherein:

said connecting conduit terminating in flexible connectors, said flexible connectors establishing an airtight connection with said air transfer conduit when said lid is in said closed position, said flexible connectors being released from said air transfer conduit when in said open position.

16. A liquid dispensing system comprising:

a housing comprising a base and at least two compartments for encasing a liquid container and an air pressure device;

a liquid container having an internal reservoir for containing a liquid and a dispensing conduit connected to a dispensing nozzle, said dispensing conduit being connected with said reservoir and being adapted to transfer a liquid from said reservoir to said dispensing nozzle, said base having a surface for supporting a liquid receiver, said dispensing nozzle being spaced from said surface, said liquid container being situated within one of said compartments; and an air pressure device for creating pressurized air being mounted within one of said compartments, said air pressure device being connected with said internal reservoir, whereby upon operation of said air pressure device, pressurized air is supplied to said internal reservoir which causes the liquid within said reservoir to be transferred into and through said dispensing conduit and out of said dispensing nozzle.

17. The system of claim 16 further comprising:

a liquid receiver designed to rest upon said surface and receive liquid from said dispensing nozzle upon activation of said air pressure device.

18. The system of claim 16 further comprising:

an air transfer conduit for connecting said air pressure device to said internal reservoir.

19. The system of claim 16 wherein:

said air pressure device comprises bellows.

20. The system of claim 19 wherein:

said air pressure device comprises an external activation mechanism for operating said bellows, said air pressure device comprises a bellows, said bellows being movable to a collapsed position by said activation mechanism, said air pressure device further comprising a means for evenly collapsing said bellows.

21. The system of claim 20 wherein:

said means comprising a parallelogram linkage arrangement.

22. The system of claim 16 wherein:

said liquid container comprises a removable cap for access to said internal reservoir for resupplying liquid to within said internal reservoir, said dispensing conduit and said dispensing nozzle being disconnectable from said internal reservoir.

23. The system of claim 16 further comprises:

a heat retaining device situated underneath said liquid container.

24. The system of claim 16 wherein:

said liquid container comprises insulated walls and said container is removable from said housing.

25. The system of claim 16 wherein:

said liquid container being mounted within a housing, said housing including a lid, said lid being movable between a closed position enclosing said liquid container to an open position permitting access to said liquid container, said lid having a latching means for securing of said lid to said housing when said lid is in said closed position, said latching means being operable to unsecure said lid from said housing to permit said lid to be moved to said open position.

26. The system of claim 25 wherein:

said lid having a connecting conduit which connects with said air transfer conduit, said connecting conduit separates from said air transfer conduit when said lid is located in said open position.

27. The system of claim 26 wherein:

said connecting conduit terminating in flexible connectors, said flexible connectors establishing an airtight connection with said air transfer conduit when said lid is in said closed position, said flexible connectors being released from said air transfer conduit when in said open position.

28. A method of manufacturing a liquid dispensing apparatus, said method comprising:

providing an apparatus comprising a liquid container having an internal reservoir for containing a liquid and a dispensing conduit connected to a dispensing nozzle, said dispensing conduit being situated within said reservoir and being adapted to transfer liquid from said reservoir to said dispensing nozzle, a base having a surface for holding a liquid receiver, said dispensing nozzle of said liquid container being spaced from said surface, and an air pressure device for creating pressurized air being mounted in conjunction with said base, said air pressure device being connected with said internal reservoir of said liquid container, whereby upon operation of said air pressure device pressurized air is supplied to said internal reservoir of said liquid container which causes liquid within said reservoir to be transferred into and through said dispensing conduit and out of said dispensing nozzle.

* * * * *